US007774516B2

(12) United States Patent
Hsieh et al.

(10) Patent No.: US 7,774,516 B2

(45) Date of Patent: Aug. 10, 2010

(54) COMMUNICATING SYSTEM AND METHOD THEREOF

(75) Inventors: Chih-tao Hsieh, Shijr (TW); Fu-Chin Shen, Shijr (TW); Chi-Hung Kao, Shijr (TW)

(73) Assignee: Aten International Co., Ltd. (TW)

( * ) Notice: Subject to any disclaimer, the term of this patent is extended or adjusted under 35 U.S.C. 154(b) by 841 days.

(21) Appl. No.: 11/557,596

(22) Filed: Nov. 8, 2006

(65) Prior Publication Data

US 2008/0122784 A1 May 29, 2008

(51) Int. Cl.
*G06F 3/00* (2006.01)

(52) U.S. Cl. ............................ 710/36; 710/1; 709/238; 709/240; 700/1; 700/83; 700/84

(58) Field of Classification Search ................ 345/156, 345/168; 710/1, 36; 700/1, 83, 84; 709/212, 709/238, 245, 246

See application file for complete search history.

(56) References Cited

U.S. PATENT DOCUMENTS 6,137,455 A * 10/2000 Duo ............................ 345/520
6,595,707 B1 * 7/2003 Kuwata ...................... 398/140
7,456,696 B2 * 11/2008 Shen ........................... 331/74
7,528,638 B2 * 5/2009 Lee et al. .................... 327/158
2003/0128185 A1 * 7/2003 Arai et al. .................. 345/156

* cited by examiner

*Primary Examiner*—My-Chau T Tran
(74) *Attorney, Agent, or Firm*—Chen Yoshimura LLP

(57) ABSTRACT

A communicating system suitable for a repeater and communicating method thereof are described. The communicating system comprises a receiving unit, a delay module, a transmitting unit and a control unit. The receiving unit transmits a first signal based on a KB/MS input signal. The delay module is coupled to the receiving unit and delays the first signal from the receiving unit in order to generate a second signal. The second signal has a first phase difference in comparison with the first signal. The transmitting unit is coupled to the delay module and the control unit. The transmitting unit transmits a KB/MS output signal based on the second signal while the control unit controls the transmitting unit via a control signal. Specifically, the control unit is coupled to the receiving unit, the delay module and the transmitting unit such that the control unit generates the control signal based on the first signal from the receiving unit and controls the transmitting unit by inputting the control signal into the transmitting unit. That is, the control signal of the control unit triggers the transmitting unit to dominate output control of the delayed second signal of transmitting unit. The control signal generated by the control unit has a second phase difference in comparison with the first signal.

7 Claims, 6 Drawing Sheets

COMMUNICATING SYSTEM AND METHOD THEREOF

FIELD OF THE INVENTION

The present invention relates to an electrical system and method thereof, and more particularly to a communicating system and method thereof which are suitable for a repeater used in a keyboard-video-mouse (KVM) system.

BACKGROUND OF THE INVENTION

A keyboard-video-mouse (KVM) switch has been developed as an important solution in a computer system for managing a plurality of computers via a single console station, including a keyboard, a mouse, and a video display. Traditionally, a KVM switch is directly connected to each of the computers and the console station is coupled to the KVM switch to allow the user to operate one of the plurality of computers by employing the keyboard, the mouse, and the video display of the console station.

For the purpose of transmission distance extension of console signal, a set of KVM transmitting/receiving extender is disposed between the computers and the console station to extend the transmission length of the console signal from the computer to the console station. However, even if the KVM transmitting/receiving extender is employed, the transmission distance of the console signal is not enough to meet the management requirement of the computers. Thus, in the prior art, a repeater is disposed between the KVM transmitting/receiving extenders and utilized to further enlarge the transmission distance of the console signal. Nevertheless, while transmitting the console signal, the repeater has to decode the received console signal from the KVM transmitting extender and then encode the processed console signal in order to complete the transmission procedure. The decoding and encoding processes of the console signal are quite complicated and time-consuming within the repeater, thereby resulting in the inefficient transmission operation of the computer system.

Consequently, there is a need to develop a communicating system to solve the above-mentioned problems.

SUMMARY OF THE INVENTION

One object of the present invention is to provide a communicating system and method used in a repeater for extending the distance of the transmission signal easily.

Another object of the present invention is to provide a communicating system and method used in a repeater for transmitting the KB/MS signal and video signal of a KVM system rapidly.

The repeater includes a communicating system and a video processing unit. The video processing unit has a plurality of video receiving units, a plurality of video transmitting units, a plurality of equalizers, a signal level detector and a computing unit. The communicating system receives the KM/MS input signal from the KVM transmitting/receiving extender and generates the KM/MS output signal to be sent to the KVM transmitting/receiving extender. Further, the video processing unit receives the video input signal from the KVM transmitting/receiving extender and outputs a video output signal on the basis of the video input signal.

Specifically, the receiving units receive the video input signal and send the received video input signal to the equalizer. The signal level detector is coupled to the receiving unit and the equalizer for receiving the KB/MS input signal of the communicating system and the received video input signal of the receiving unit. Then, the signal level detector detects the levels of the KB/MS input signal and received video input signal to generate a level indicating signal to the computing unit. The equalizers are coupled between the receiving unit and the transmitting unit and equalize the received video signal from the receiving unit. The computing unit is coupled to the signal level detector and the equalizer, and the computing unit generates a compensating signal by computing the level indicating signal from the signal level detector so that the compensating signal compensates the received video input signal which is equalized by the equalizer. The equalized and compensated video input signal is then transmitted to the transmitting unit. Thus, the transmitting unit reliably outputs the video output signal to a KVM transmitting/receiving extender.

The communicating system comprises a receiving unit, a delay module, a transmitting unit and a control unit. The receiving unit transmits a first signal based on the KB/MS input signal. The delay module is coupled to the receiving unit and delays the first signal from the receiving unit in order to generate a second signal. The second signal has a first phase difference in comparison with the first signal.

The transmitting unit is coupled to the delay module and the control unit. The transmitting unit transmits the KB/MS output signal based on the second signal while the control unit controls the transmitting unit via a control signal. Further, the control unit is coupled to the output of the receiving unit, the delay module and the transmitting unit such that the control unit generates the control signal based on the first signal from the receiving unit and controls the transmitting unit by inputting the control signal into the transmitting unit. That is, the control signal of the control unit is able to trigger the transmitting unit to dominate output control of the delayed second signal of transmitting unit. The control signal generated by the control unit has a second phase difference in comparison with the first signal.

In a timing diagram, the horizontal axis represents time and the vertical axis represents the amplitudes of the signals. During a time interval, the KB/MS input signal is inputted into the receiving unit to generate the first signal. Then, the first signal is delayed to generate the second signal having a first phase difference in comparison with the first signal. Meanwhile, the first signal is inputted into the control unit for generating a control signal. The control signal has a second phase difference compared with the first signal.

Preferably, the second phase difference is equal to the first phase difference such that the transmitting unit completely and precisely outputs the second signal according to the control signal to generate the KB/MS output signal. In this case, while the transmitting unit is triggered by the transition edges, such as UP edge and DOWN edge, of the control signal, the UP edge and the DOWN edge are preferably aligned to the first rising edge and last falling edge of the second signal, respectively, during the time interval. In other words, during the interval between UP signal and DOWN signal, the waveform of the KB/MS output signal, inputted the transmitting unit, is identical to the waveform of the KB/MS input signal of receiving unit except the second phase difference between the first and second signals. Thus, the transmitting unit correctly generates the KB/MS output signal. It should be noted that the delay time of the delay module can be adaptively adjusted so that the control unit precisely controls the transmitting unit to be triggered by the control signal.

Alternatively, the second phase difference is greater than the first phase difference such that the transmitting unit completely outputs the second signal according to the control signal from the control unit. In this case, while the transmitting unit is triggered by the transition edges, such as UP edge and DOWN edge, of the control signal, the UP edge of the control signal leads the first rising edge of the second signal and the DOWN edge of the control signal lags the last falling edge of the second signal. In other words, the output interval of the second signal is disposed within the triggering interval of the control signal. Therefore, the transmitting unit completely and correctly generates the KB/MS output signal during the triggering interval in order to avoid outputting irregular KB/MS output signal.

In operation, the receiving unit generates a first signal based on a KB/MS input signal. Then, the delay module delays the first signal to generate a second signal having a first phase difference in comparison with the first signal. Afterwards, the control unit generates a control signal based on the first signal. The control unit then inputs the control signal into the transmitting unit to dominate the transmitting unit, wherein the control signal has a second phase difference in comparison with the first signal. Finally, the transmitting unit transmits an output signal based on the second signal while the control signal is inputted. While the control unit generates a control signal based on the first signal, the generating method further comprises the steps of: the first inverter inverts the first signal into a third signal; the filtering unit filters the third signal to generate a fourth signal; and the second inverter inverts the fourth signal into the control signal to output the control signal stably.

The advantages of the present invention includes: (a) easily extending the transmission distance of the KB/MS signal by a delay module and a control unit; and (b) rapidly transmitting the KB/MS signal of the KVM devices to server computers.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
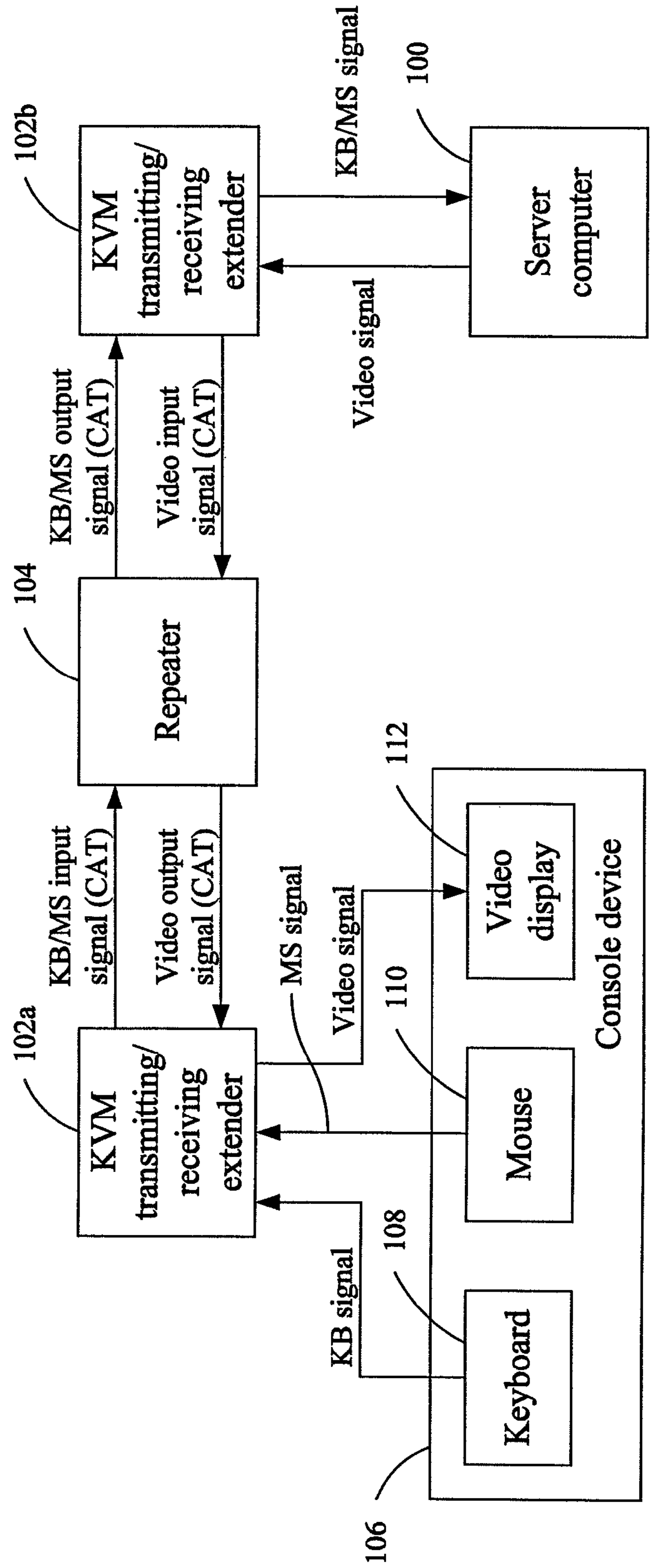
FIG. 1 is a block diagram of a KVM system with a repeater according to one embodiment of the present invention.

Please refer to FIG. 1 which depicts a block diagram of a KVM system with a repeater according to one embodiment of the present invention. The present KVM system includes KVM transmitting/receiving extenders (102*a*, 102*b*), a repeater 104. The KVM system couples the console device 106, having a keyboard 108, a mouse 110 and a video display 112, to a server computer 100 via the KVM transmitting/receiving extenders (102*a*, 102*b*) and the repeater 104.

The keyboard 108 and mouse 110 of the console device 106 issue a keyboard (KB) signal and a mouse (MS) signal, such as analog KB/MS signals, to the KVM transmitting/receiving extender 102*a*. The KVM transmitting/receiving extender 102*a* then converts the KB and MS signals into a KB/MS input signal which can be transmitted on a CAT series cable (including category 5, a category 5e or a category 6) to extend the transmission distance of the KB and MS signals. It should be noted that the transmission arrangement of CAT series cable in the present invention can be implemented by U.S. Pat. No. 6,137,455, entitled "Computer keyboard, mouse and VGA monitor signal transmission arrangement," incorporated by reference herein.

Afterwards, the repeater 104 receives the KB/MS input signal and generates a KB/MS output signal which can be transmitted on the CAT series cable to the KVM transmitting/receiving extender 102*b* for further increasing transmission distance of the KB/MS input signal by enhancing the signal intensity. Next, the KVM transmitting/receiving extender 102*b* converts the KB/MS output signal into a KB/MS signal and outputs the KB/MS signal into the server computer 100. Thus, the keyboard 108 and the mouse 110 easily control the operation of the server computer 100 since the KB/MS signal of the keyboard and mouse is reliably sent to the server computer 100.

Meanwhile, a video signal generated by the server computer 100 is inputted to the KVM transmitting/receiving extender 102*b*. The KVM transmitting/receiving extender 102*b* converts the video signal to generate a video input signal and transmits the video input signal to the repeater 104 by using the CAT series cable. Then, the repeater 104 generates a video output signal to be outputted to the KVM transmitting/receiving extender 102*a* via the CAT series cable. The KVM transmitting/receiving extender 102*a* transforms the video output signal into the original video signal in order to display images on the video display 112 of the console device 106. The repeater 104 will be depicted in further detail below.

Figure 2:
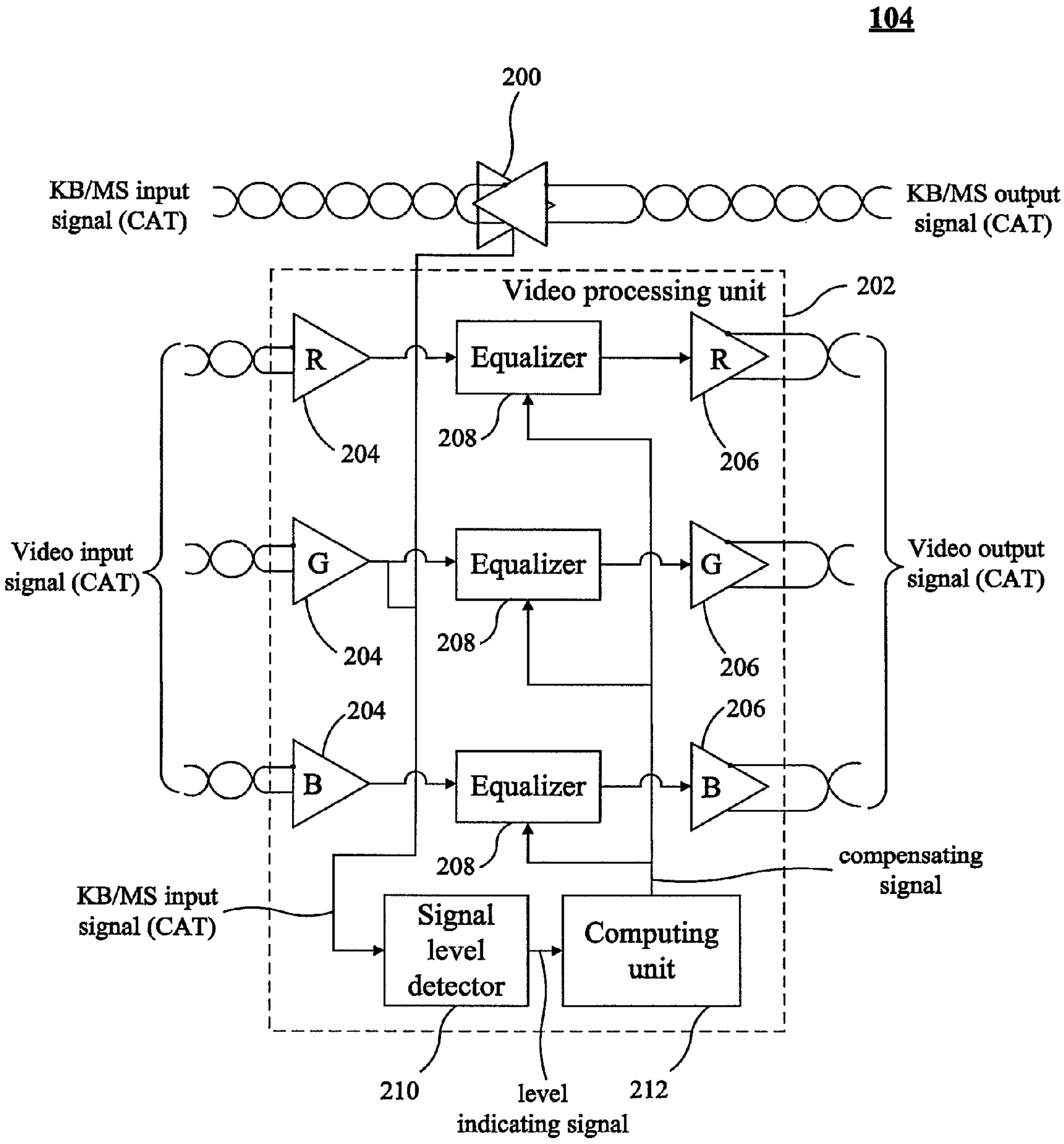
FIG. 2 is a schematic diagram of the repeater shown in FIG. 1 according to one embodiment of the present invention.
Figure 3:
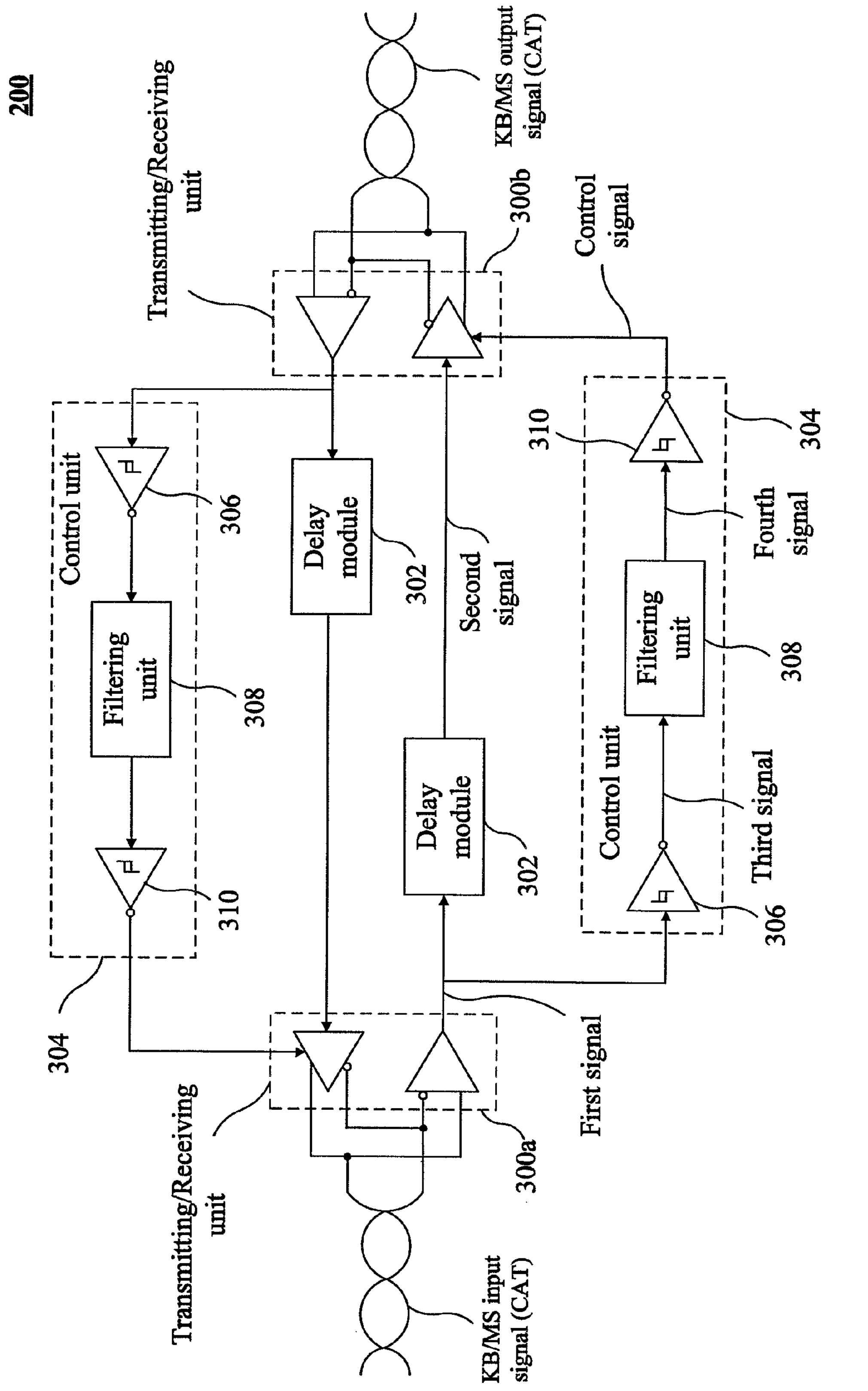
FIG. 3 is a schematic diagram of a communicating system of the repeater shown in FIG. 2 according to one embodiment of the present invention.

Please refer to FIG. 1 and FIG. 2. FIG. 2 depicts a schematic diagram of the repeater shown in FIG. 1 according to one embodiment of the present invention. The repeater 104 includes a communicating system 200 and a video processing unit 202. The video processing unit 202 has a plurality of video receiving units 204, a plurality of video transmitting units 206, a plurality of equalizers 208, a signal level detector 210 and a computing unit 212. The communicating system 200 receives the KM/MS input signal from the KVM transmitting/receiving extender 102*a* and generates the KM/MS output signal to be sent to the KVM transmitting/receiving extender 102*b*. FIG. 3 depicts the communicating system 200 in detail. Further, the video processing unit 202 receives the video input signal from the KVM transmitting/receiving extender 102*b* shown in FIG. 1 and outputs a video output signal on the basis of the video input signal.

Specifically, the receiving units 204, such as half duplex transceivers having red (R), green (G) and blue (B) components which are compliant with the RS-485 standard, receive the video input signal and send the received video input signal to the equalizer 208. The signal level detector 210 is coupled to the receiving unit 204 and the equalizer 208 for receiving the KB/MS input signal of the communicating system 200 and the received video input signal of the receiving unit 204. Then, the signal level detector 210 detects the levels of the KB/MS input signal and received video input signal to generate a level indicating signal to the computing unit 212. The equalizers 208 are coupled between the receiving unit 204 and the transmitting unit 206 and equalize the received video signal from the receiving unit 204. The computing unit 212 is coupled to the signal level detector 210 and the equalizer 208, and the computing unit 212 generates a compensating signal by computing the level indicating signal from the signal level detector 210 so that the compensating signal compensates the received video input signal which is equalized by the equalizer 208. The equalized and compensated video input signal is then transmitted to the transmitting unit 206, such as half duplex transceivers having red (R), green (G) and blue (B) components which are compliant with the RS-485 standard to generate a video output signal. Thus, the transmitting unit 206 reliably outputs the video output signal to the KVM transmitting/receiving extender 102*b*.

Please refer to FIG. 3 which is a schematic diagram of a communicating system of the repeater shown in FIG. 2 according to one embodiment of the present invention. The communicating system 200 comprises a transmitting/receiving unit 300*a*, a delay module 302, a transmitting/receiving unit 300*b* and a control unit 304. The transmitting/receiving unit 300*a* transmits a first signal based on the KB/MS input signal. The delay module 302 is coupled to the transmitting/receiving unit 300*a* and delays the first signal from the transmitting/receiving unit 300*a* in order to generate a second signal. The second signal has a first phase difference in comparison with the first signal.

The transmitting/receiving unit 300*b* is coupled to the delay module 302 and the control unit 304. The transmitting/receiving unit 300*b* transmits the KB/MS output signal based on the second signal while the control unit 304 controls the transmitting/receiving unit 300*b* via a control signal. Further, the control unit 304 is coupled to the output of the transmitting/receiving unit 300*a*, the delay module 302 and the transmitting/receiving unit 300*b* such that the control unit 304 generates the control signal based on the first signal from the transmitting/receiving unit 300*a* and controls the transmitting/receiving unit 300*b* by inputting the control signal into the transmitting/receiving unit 300*b*. That is, the control signal of the control unit 304 is able to trigger the transmitting/receiving unit 300*b* to dominate the output control of the delayed second signal of transmitting/receiving unit 300*b*. The control signal generated by the control unit 304 has a second phase difference in comparison with the first signal.

Figure 4:
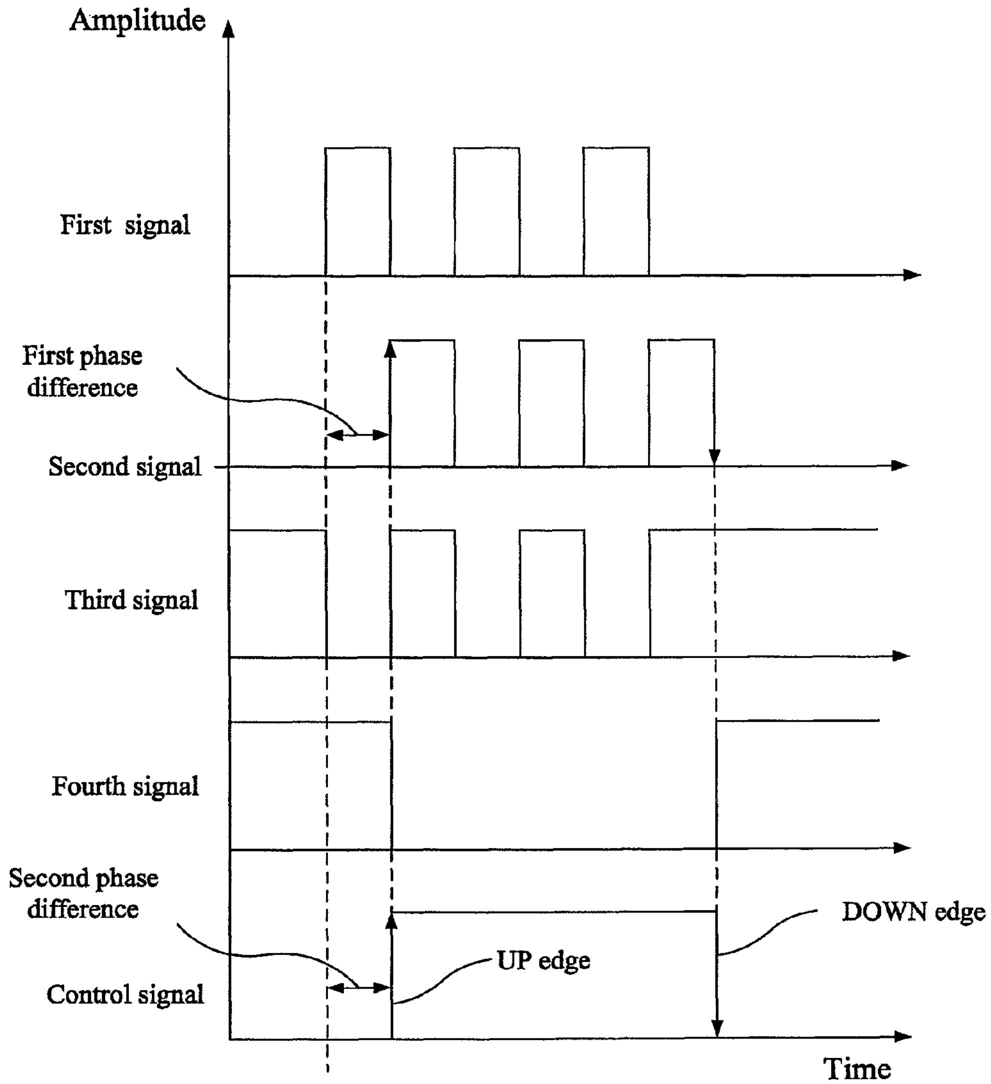
FIG. 4 is a timing diagram of the communicating system shown in FIG. 3 according to one embodiment of the present invention.

Please refer to FIG. 3 and FIG. 4 which illustrates a timing diagram of the communicating system 200 shown in FIG. 3 according to one embodiment of the present invention. In the timing diagram, the horizontal axis represents time and the vertical axis represents the amplitudes of the signals. During a time interval, the KB/MS input signal is inputted into the transmitting/receiving unit 300*a* to generate the first signal. Then, the first signal is delayed to generate the second signal having a first phase difference in comparison with the first signal. Meanwhile, the first signal is inputted into the control unit 304 for generating a control signal. The control signal has a second phase difference compared with the first signal.

Preferably, the second phase difference is equal to the first phase difference such that the transmitting/receiving unit 300*b* completely and precisely outputs the second signal to generate the KB/MS output signal according to the control signal. In this case, while the transmitting/receiving unit 300*b* is triggered by the transition edges, such as UP edge and DOWN edge, of the control signal, the UP edge and the DOWN edge are preferably aligned to the first rising edge and last falling edge of the second signal, respectively, during the time interval. In other words, during the interval between UP signal and DOWN signal, the waveform of the KB/MS output signal, inputted the transmitting/receiving unit 300*b*, is identical to the waveform of the KB/MS input signal of transmitting/receiving unit 300*a* except the second phase difference between the first and second signals. Thus, the transmitting/receiving unit 300*b* correctly generates the KB/MS output signal. It should be noted that the delay time of the delay module 302 can be adaptively adjusted so that the control unit 304 precisely controls the transmitting/receiving unit 300*b* to be triggered by the control signal.

Alternatively, the second phase difference is smaller than the first phase difference such that the transmitting/receiving unit 300*b* completely outputs the second signal according to the control signal from the control unit 304. In this case, while the transmitting/receiving unit 300*b* is triggered by the transition edges, such as UP edge and DOWN edge, of the control signal, the UP edge of the control signal leads the first rising edge of the second signal and the DOWN edge of the control signal lags the last falling edge of the second signal. In other words, the output interval of the second signal is disposed within the triggering interval of the control signal. Therefore, the transmitting/receiving unit 300*b* completely and correctly generates the KB/MS output signal during the triggering interval in order to avoid outputting irregular KB/MS output signal.

In one embodiment, the transmitting/receiving unit 300*a* is a half duplex transceiver which is compliant with the RS-485 standard for receiving/transmitting the KB/MS input/output signal. Similarly, the transmitting/receiving unit 300*b* is a half duplex transceiver which is in compliance with the RS-485 standard transmitting/receiving the KB/MS output/input signal. Furthermore, the KB/MS input signal inputted into the transmitting/receiving unit 300*a* and the KB/MS output signal outputted from the transmitting/receiving unit 300*b* are differential type signals for eliminating the noise components within the KB/MS input and output signals.

Please refer to FIG. 3 continuously. In one preferred embodiment of the present invention, the control unit 304 comprises a first inverter 306, a filtering unit 308 and a second inverter 310. The first inverter 306 is able to invert the first signal into a third signal. The filtering unit 308 is coupled to the first inverter 306 and filters the third signal to generate a fourth signal. The second inverter 310 is coupled to the filtering unit 308 and inverts the fourth signal into the control signal for stably outputting the control signal. The fourth signal generated by the filtering unit 308 is first filtered to eliminate the noise component of the fourth signal. Preferably, the filtering unit 308 is a hysteresis inverter circuit to eliminate the noise component within the fourth signal. Therefore, the second signal is stably outputted through the transmitting/receiving unit 300*b* while the transmitting/receiving unit 300*b* is triggered by the control signal from the hysteresis inverter circuit 310.

Figure 5:
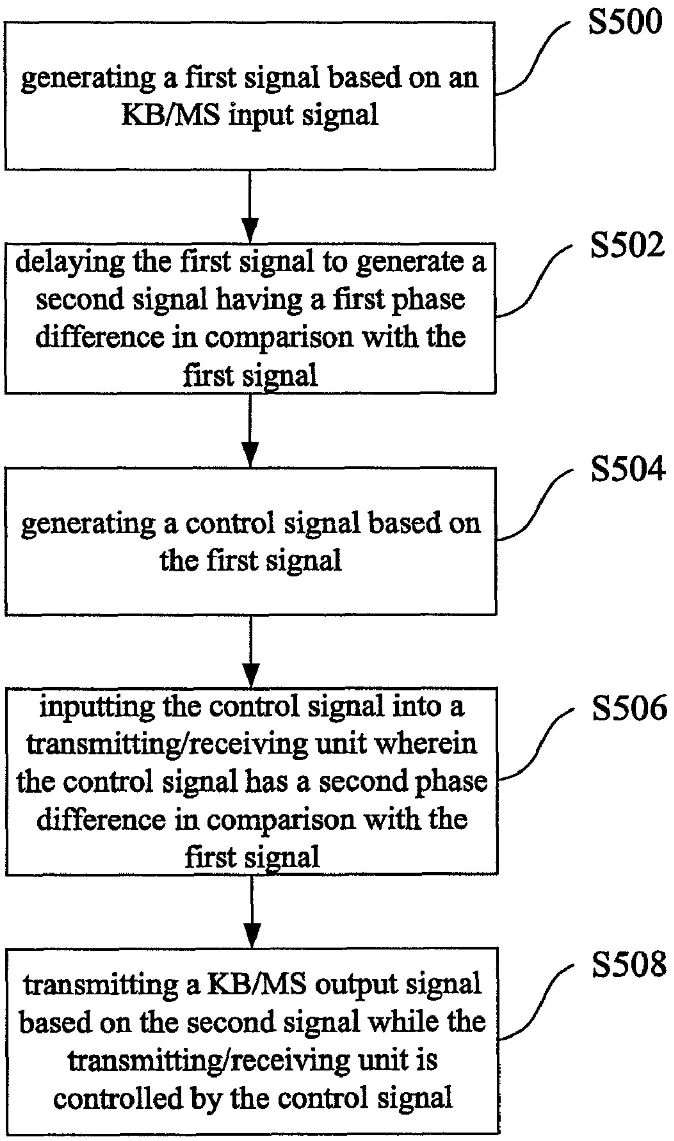
FIG. 5 is a flow chart of performing the communicating system according to one embodiment of the present invention.

Please refer to FIG. 3 and FIG. 5 which depicts a flow chart of performing the communicating system according to one embodiment of the present invention. As depicted in the above-mentioned description, the communicating system 200 mainly comprises a transmitting/receiving unit 300*a*, a delay module 302, a transmitting/receiving unit 300*b*, and a control unit 304 having a first inverter 306, a filtering unit 308 and a second inverter 310. The communicating method depicted in FIG. 5 is implemented by the communicating system shown in FIG. 3. First, in step S500, the transmitting/receiving unit 300*a* generates a first signal based on a KB/MS input signal. Then, in step S502, the delay module 302 delays the first signal to generate a second signal having a first phase difference in comparison with the first signal. Afterwards, in step S504, the control unit 304 generates a control signal based on the first signal. In step S506, the control unit 304 inputs the control signal into the transmitting/receiving unit 300*b* to dominate the transmitting/receiving unit 300*b*, wherein the control signal has a second phase difference in comparison with the first signal. Finally, in step S508, the transmitting/receiving unit 300*b* transmits a KB/MS output signal based on the second signal while the control signal is inputted.

Figure 6:
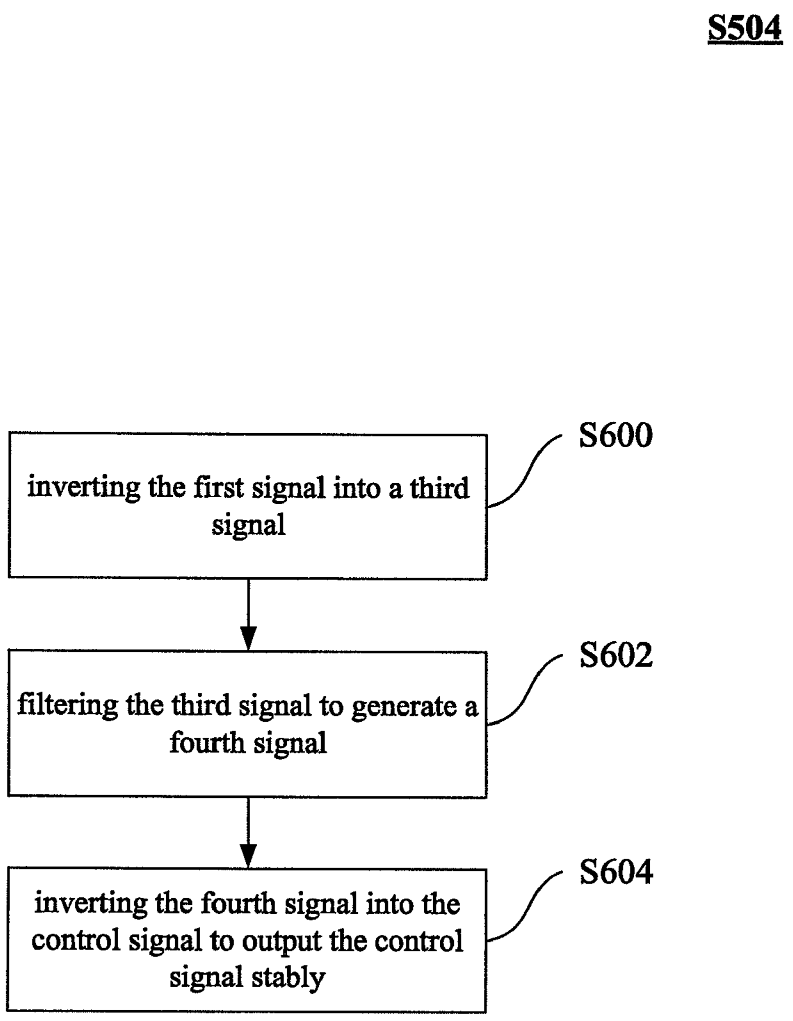
FIG. 6 is a flow chart of generating a control signal by using the control unit of the communicating system according to one embodiment of the present invention.

FIG. 6 is a flow chart of generating a control signal by using the control unit of the communicating system according to one embodiment of the present invention. During the step of S504, while the control unit 304 generates a control signal based on the first signal, the generating method further comprises the steps of: (S600) the first inverter inverts the first signal into a third signal; (S602) the filtering unit filters the third signal to generate a fourth signal; and (S604) the second inverter inverts the fourth signal into the control signal to output the control signal stably.

The advantages of the present invention includes: (a) easily extending the transmission distance of the KB/MS signal by a delay module and a control unit; and (b) rapidly transmitting the KB/MS signal of the KVM devices to server computers.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A communicating system, comprising:

a receiving unit, generating a first signal based on an input signal;

a delay module coupled to the receiving unit, delaying the first signal from the receiving unit to generate a second signal;

a transmitting unit coupled to the delay module, transmitting an output signal based on the second signal while the transmitting unit is controlled by a control signal; and a control unit coupled to the receiving unit, the delay module and the transmitting unit, generating the control signal based on the first signal and controlling the transmitting unit by inputting the control signal into the transmitting unit;

wherein the second signal further has a first phase difference compared with the first signal and the control signal has a second phase difference compared with the first signal, and the second phase difference has a value which is equal to or smaller than a value of the first phase difference.

2. A communicating system, comprising:

a receiving unit, generating a first signal based on an input signal;

a delay module coupled to the receiving unit, delaying the first signal from the receiving unit to generate a second signal;

a transmitting unit coupled to the delay module, transmitting an output signal based on the second signal while the transmitting unit is controlled by a control signal; and a control unit coupled to the receiving unit, the delay module and the transmitting unit, generating the control signal based on the first signal and controlling the transmitting unit by inputting the control signal into the transmitting unit;

wherein the control unit comprises:

a first inverter, inverting the first signal into a third signal;

a filtering unit coupled to the first inverter, filtering the third signal to generate a fourth signal; and a second inverter coupled to the filtering unit, inverting the fourth signal into the control signal and stably outputting the control signal to the transmitting unit.

3. A communicating system, comprising:

a receiving unit, generating a first signal based on an input signal;

a delay module coupled to the receiving unit, delaying the first signal from the receiving unit to generate a second signal;

a transmitting unit coupled to the delay module, transmitting an output signal based on the second signal while the transmitting unit is controlled by a control signal; and a control unit coupled to the receiving unit, the delay module and the transmitting unit, generating the control signal based on the first signal and controlling the transmitting unit by inputting the control signal into the transmitting unit;

wherein the receiving unit and the transmitting unit are half duplex transceivers.

4. The communicating system of claim 3, wherein the transmitting unit and the receiving unit are in compliance with the RS-485 standard.

5. The communicating system of claim 1, wherein the input signal and the output signal are differential type signals.

6. The communicating system of claim 2, wherein the input signal and the output signal are differential type signals.

7. The communicating system of claim 3, wherein the input signal and the output signal are differential type signals.

* * * * *